(No Model.)
E. J. HILDRETH & T. R. MILLER.
UNIVERSAL MARKER.
No. 335,357. Patented Feb. 2, 1886.
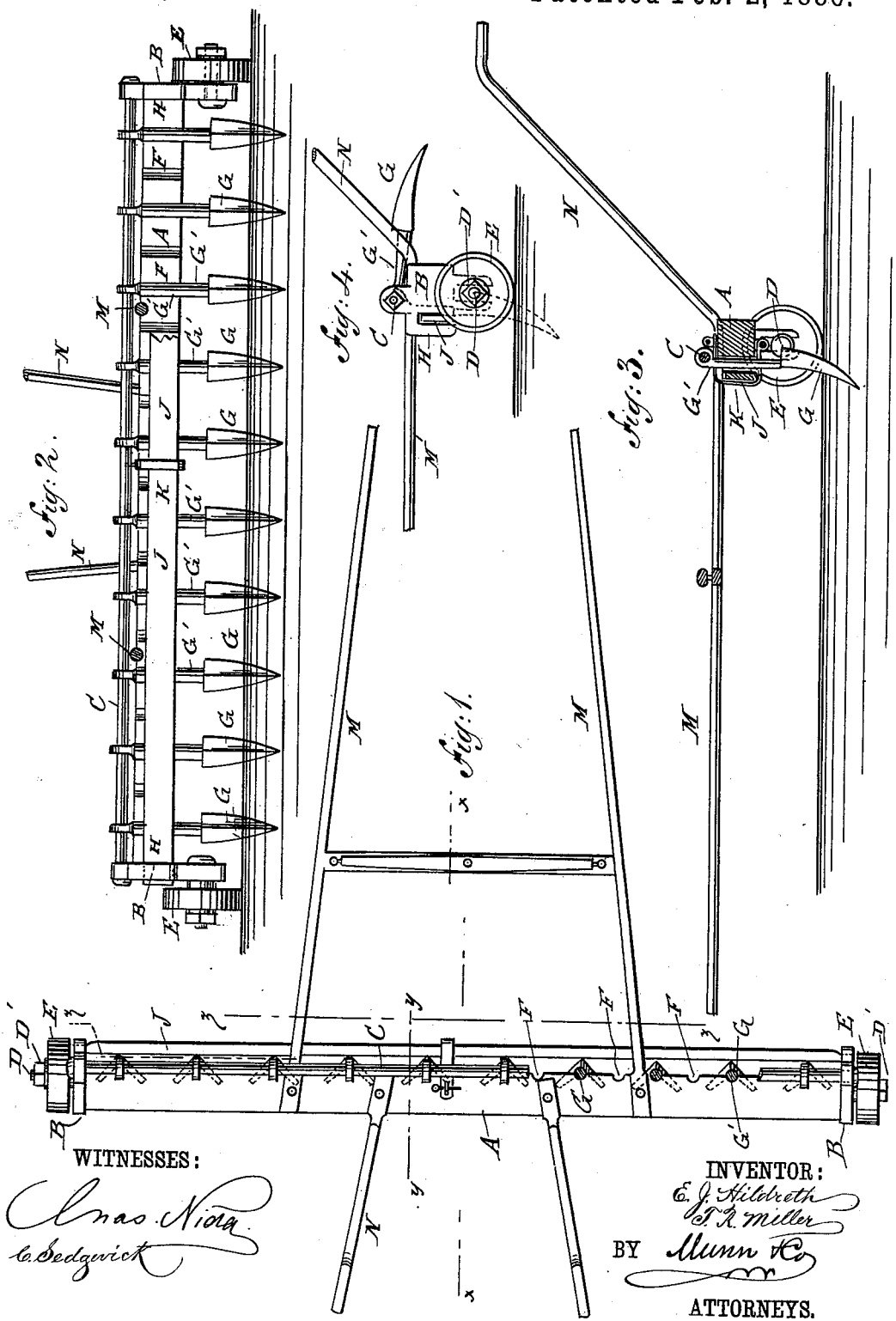
WITNESSES:
Chas. Niota
C. Sedgwick
INVENTOR:
E. J. Hildreth
T. R. Miller
BY Munn &Co
ATTORNEYS.

UNITED STATES PATENT OFFICE.

ELMER J. HILDRETH AND THOMAS R. MILLER, OF NEW HAVEN, CONN.

UNIVERSAL MARKER.

SPECIFICATION forming part of Letters Patent No. 335,357, dated February 2, 1886.

Application filed September 8, 1885. Serial No. 176,495. (No model.)

*To all whom it may concern:*

Be it known that we, ELMER J. HILDRETH and THOMAS R. MILLER, both of New Haven, in the county of New Haven and State of Connecticut, have invented a new and Improved Universal Marker, of which the following is a full, clear, and exact description.

The object of our invention is to provide a new and improved universal marker which can be used for marking fields for seed-drills, hand-planters, and other planting-machines.

The invention consists in the construction and combination of parts and details, as will be fully described and set forth hereinafter, and then pointed out in the claims.

Reference is to be had to the accompanying drawings, forming part of this specification, in which similar letters of reference indicate corresponding parts in all the figures.

Figure 1 is a plan view of our improved universal marker, parts being broken out and others in section. Fig. 2 is a front view of the same, parts being in section on the line $z\ z\ z$, Fig. 1. Fig. 3 is a cross-sectional view of the same on the line $x\ y\ y\ x$, Fig. 1. Fig. 4 is an end view of the same.

The bar A is provided with an end piece, B, on each end, the said end pieces projecting above the top and bottom edges of the bar A. The upper projecting ends are united by a rod, C, extending over the top of the bar A, and the lower ends of the end pieces are forked, and in said forked ends pivots D are held adjustably by nuts D', and on said pivots the rollers E are mounted, and thus support the ends of the bar A. A series of grooves, F, are provided in the front surface of the bar A, and extend from the top to the bottom edge.

On the rod C the shanks G' of the shovels or marking-points G are mounted to slide. These may be as many in number as there are grooves F in the bar A, and, as shown, are formed as pointed shovels at their lower ends.

In the front edge of each end piece B a downwardly-projecting prong, H, is formed, and between the said prongs and the front edges of the said end pieces the ends of a bar, J, are passed, the said bar J extending over the shank G' on the front of the bar A, and thus holding the said shanks in place on the said bar. An angular hasp, K, is hung on the bottom edge of the bar A, and serves to hold the bar J in place, a staple being provided on the upper surface of the bar A for receiving a pin for the purpose of holding the hasp in place. Shafts M and handles N are secured on the bar A.

The operation is as follows: When the bar J is removed, the shanks G' can be swung up and can be shifted on the rod C to the right or left until they are in the desired positions, and are then swung down into the grooves F, and are locked in place by the bar J, the ends of which are passed under the prongs H. In case any shovels are not to be used they are swung to the rear, as shown in Fig. 4. The shovels can thus be grouped and spaced as may be necessary or desired, and any number be taken out.

The bar A can be adjusted a greater or less distance above the ground by adjusting the pivots of the rollers E a greater or less distance from the lower ends of the end pieces, B.

Having thus described our invention, what we claim as new, and desire to secure by Letters Patent, is—

1. The combination, with a bar, of a rod held on the top of the same parallel with said bar, and of a series of shovel-shanks held on said rod and extending down in front of the bar, substantially as herein shown and described.

2. The combination, with a bar having vertical grooves in its front, of a rod held on the top of the same parallel with the bar, and of shovel-shanks hung on said rod and extending down through the grooves in the bar, substantially as herein shown and described.

3. The combination, with a bar, of end pieces on the same, a rod held above the bar parallel with the same, and having its ends held on said end pieces, rollers mounted on the end pieces, and of shovel-shanks mounted to slide and swing on said rod, and hanging down in front of the above-mentioned bar, substantially as herein shown and described.

4. The combination, with a bar, of a rod on the same, shovel-shanks on the rod, and of a bar held in front of the shanks and serving to hold the shanks in place, substantially as herein shown and described.

5. The combination, with the bar A, of the rod C on the same, the end pieces, B, having the prongs H, and of the bar J, substantially as herein shown and described.

6. The combination, with the bar A, of the rod C, held on the same, the shovels G on the same, the end pieces, B, having the prongs H, the bar J, and the hasp K on the bar A, substantially as herein shown and described.

7. The combination, with the bar A, having the grooves F, of the rod C, the shovels G on the same, the end pieces, B, the locking-bar J, and devices for holding the same on the bar A, substantially as herein shown and described.

ELMER J. HILDRETH.
THOMAS R. MILLER.

Witnesses:
DWIGHT W. TUTTLE,
GROVE J. TUTTLE.